W. W. HOLLAND.
FLEXIBLE TOY ANIMAL.
APPLICATION FILED OCT. 7, 1921.

1,436,258.

Patented Nov. 21, 1922.
2 SHEETS—SHEET 1.

Witnesses:

Inventor
William W. Holland.
By
Attorney

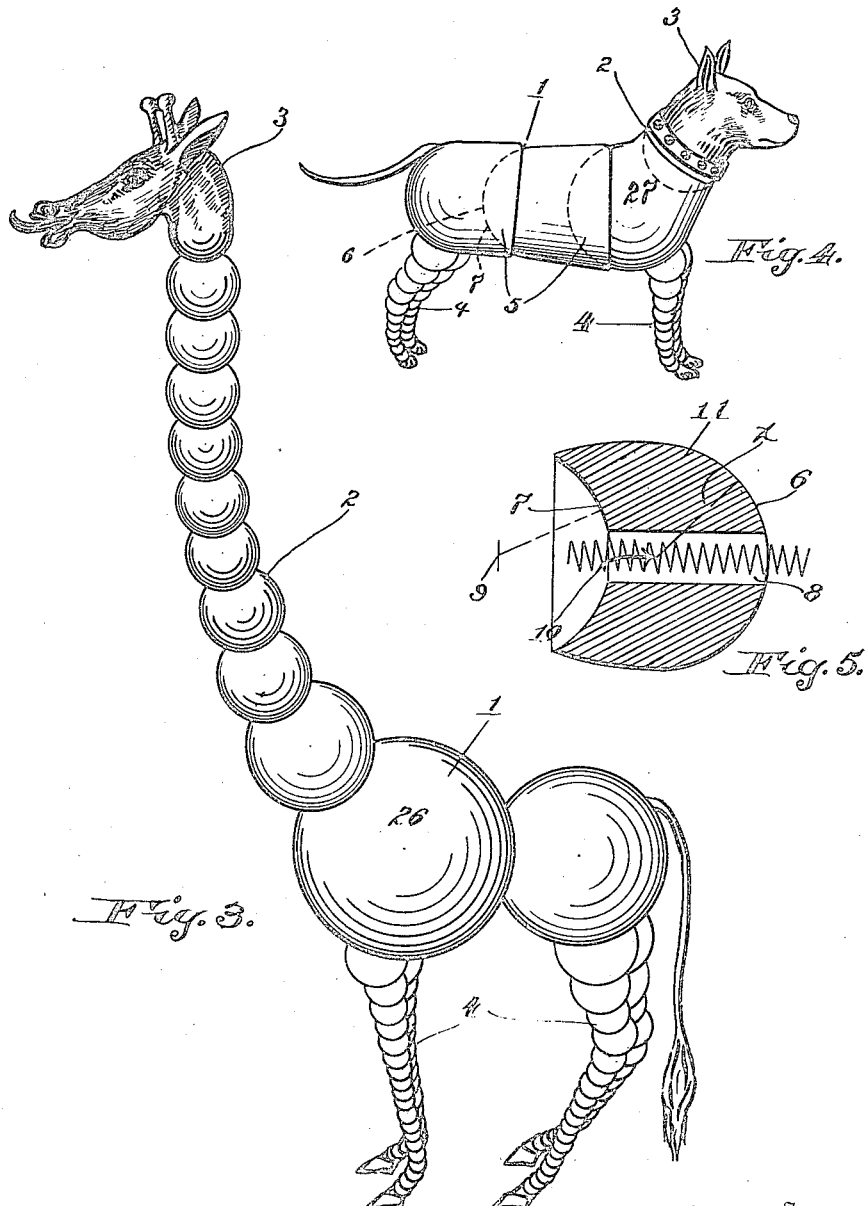

Patented Nov. 21, 1922.

1,436,258

UNITED STATES PATENT OFFICE.

WILLIAM W. HOLLAND, OF CHICAGO, ILLINOIS.

FLEXIBLE TOY ANIMAL.

Application filed October 7, 1921. Serial No. 505,967.

*To all whom it may concern:*

Be it known that I, WILLIAM W. HOLLAND, a citizen of the United States of America, residing in the city of Chicago, county of Cook, State of Illinois, have invented certain new and useful Improvements in Flexible Toy Animals, of which the following is a specification.

Children's toys in the way of imitations, illustrations or figures of animals, have been in use since prehistoric times and the desire of all children to dismember these figures and reassemble them in various forms and to distort them into strange, outlandish shapes when possible without dismembering them, is well known, and has resulted in the destruction of large numbers of toys not intended to be so treated.

The present invention relates to an animal figure toy of such nature that it may be caused to assume innumerable different attitudes, and may be subjected to all sorts of distortion without injury and may further be completely disassembled or taken apart or separated piece by piece and reassembled in its original form or any preferred arrangement and when made in sets of different animals may be combined as to the different features of the various animals to produce new, strange and unheard of creatures produced at the will and in accordance with the imagination of the possessor.

To this end the toy of the invention is constructed as to body, legs, neck and head of a series of concavo convex or ball and socket blocks which are centrally apertured and strung together by means of a flexible tension member or preferably a series of such members running through the neck and body and down the legs so that the animal is in fact constructed as to all its members of and with a series of universal joints corresponding in number to the number of blocks so that the body, neck and legs are universally flexible as to their entire length and as the elastic tension member gives the joints a tendency to set in the position in which they are left, the entire animal may be moved to any one of innumerable positions and caused to retain that position at will.

In the drawings I have illustrated a number of different types of toy animals constructed in accordance with my invention.

The types shown have been selected for illustration for the invention is in fact applicable to any variety of animal, the particular embodiment being immaterial.

Figure 3, of a giraffe;

Figure 4, of a dog; all constructed in accordance with my invention.

Figure 5 is a detailed view showing the construction of one of the ball and socket joints or blocks.

Figure 1:
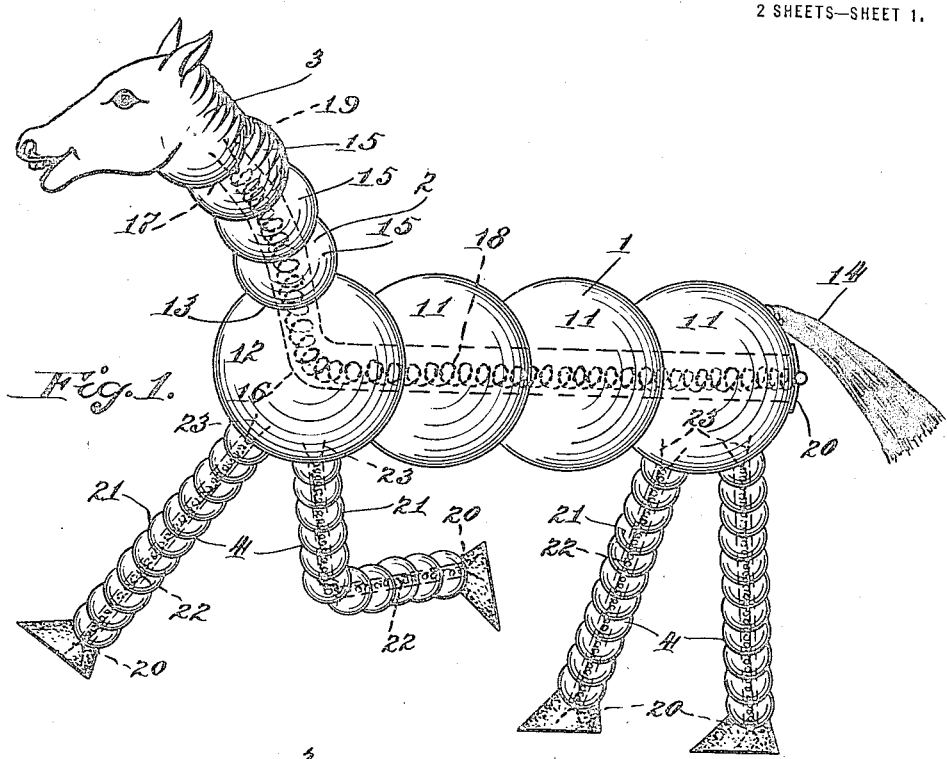
Figure 1 is a perspective view of a toy in the form of a horse.

Referring to the drawings by numerals, the detailed description will be applied to the toy animal in the form of a horse shown in Figure 1.

Figure 2:
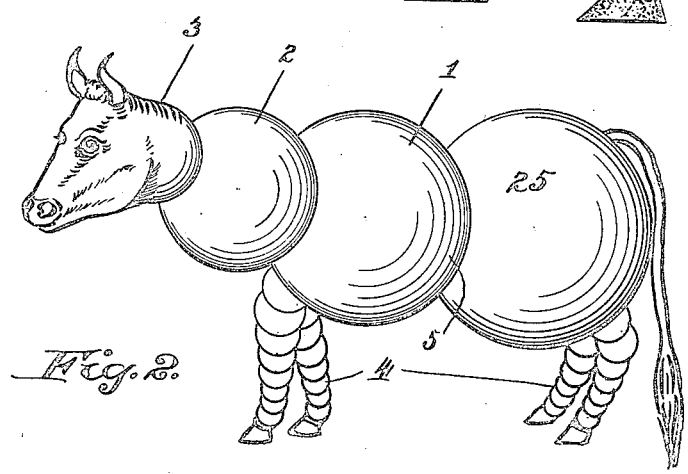
Figure 2, is a perspective view of a cow.

The animal as illustrated consists of a body portion 1, neck 2, head 3, and legs 4—4—4—4, the body, legs and neck as shown are constructed of concavo convex blocks as illustrated in section in Figure 5, the same being preferably in the form of a concavo convex spherical section having an external convex surface 6, formed on a radius X, the spherical surface 6 being cut away and reduced by the concavity 7, also preferably of spherical curvature, the surface 6 may be partly cylindrical or otherwise apart from the spherical as illustrated at 5—5 in Figure 2 and 4. The block 6 as shown is centrally apertured at 8, the opening 8 having its axis in alignment with the centers 9—10 about which the spherical surfaces 6—7 are drawn. The body is formed of a line of these concavo convex blocks 11—11—11, having at their forward end to form the shoulder, a special block 12, having instead of a main concavity 7, a small concavity 13 at the forward upper quarter, the rear block 11 made for purposes of realism being supplied with a tuft of hair 14, to present the appearance of a tail.

To form the neck I have provided a line or tier of concavo convex blocks 15—15—15, similarly formed and arranged with the convex surface of one side centrally in the convex surface of the next, the apertures of all the blocks being in alignment. The aperture 16 in the shoulder block is, however, preferably formed on an angle to connect the neck and body. The head block 3 is formed with a convex portion 17 to fit the concavity of the neck blocks, the body, neck and head are strung together by a flexible elastic tension member 18 fastened to a brad or staple 19 in the center of the convex surface 17 on the head and passed downward and backward through the alingned or registering openings in the concavo convex blocks of the neck and the body to the rear end of the rear block 11. At the rear the tension member is held by a strip 20 to which it is fastened intermediately, the strip 20 spanning the opening in the rear block. The legs 4—4—4—4 are formed of lines or tiers of concavo convex blocks 21, having central openings. These may be exact duplicates of the block illustrated in Figure 5 except as to the size. These strings of concavo convex blocks are held together by tension members 22, fastened at one end to staples 23 in the front and rear body blocks and lead downward through the openings 8 in the concavo convex blocks to the bottom of each leg or hoof or foot thereof, being held at the end by a strip or pin 20, as in the instance of the body and neck members.

The illustration includes in Figure 2 a similar structure indicated by reference character 25, assembled in the form of a cow; Figure 3, a similar toy assembled in the form of a giraffe 26 and Figure 4, a toy assembled in the form of a dog 27. In Figures 2 and 4 I have shown the body blocks with cylindrical portion 5 by which the blocks depart from the spherical.

The blocks may be of various shapes and the animals may be of innumerable different forms within the scope of my invention.

I have thus described my invention specifically and in detail so that the nature and operation of same may be clearly understood. However the specific terms herein are used descriptively rather than in a limiting sense, the scope of the invention being defined in the claims.

What I claim and desire to secure by Letters Patent is:

1. A toy in the form of an animal comprising a series of substantially spherical concavo-convex blocks having central aligned apertures and an elastic tension member extending through said apertures to hold the blocks in assembled relation the concavity of each block being adapted to receive and cooperate with the convex portion of the next block, the blocks being arranged to form the body, legs and other parts of the animal and being held in the relation described, by the tension member substantially shown and described.

2. A toy in the form of an animal comprising a series of substantially spherical concavo convex blocks having central apertures and a tension member passing through said apertures fastened at the ends forming the body of said animal and a series of similarly apertured blocks with a tension member passing through said apertures forming each leg, the concave surfaces of each block being formed to fit and receive the convex portion of the next block, forming an articulating joint.

3. A toy animal comprising a series of substantially spherical centrally apertured blocks each having a cuplike concavity placed with the apertures in alignment, the convex surface of each block being formed to enter and cooperate with the concave surface of the next block, flexible tension members extending therethrough connecting said blocks to form a body and legs, the concave and convex surfaces serving as contacting rocking surfaces so that the assembled toy has a series of universal joints, one at each point of contact between the respective blocks substantially as described.

4. A set of blocks for the construction of toy animals of various types, and of a temporary nature, the majority of the blocks being substantially spherical and having each a concave face of substantially spherical curvature to fit and receive the convex face of the next block and an aperture extending through the blocks on the line of the two centers of curvature to receive a tension member to hold the parts together, and other blocks in the form of animal heads to cooperate with the spherical blocks having curved faces to fit the curved faces of some of the other blocks and means for securing a tension member to the head blocks.

Signed by me at Baltimore, Maryland, this 17th day of September, 1921.

WILLIAM W. HOLLAND.

Witnesses:
PORTER H. FLAUTT,
CARRIE M. REELY.